United States Patent
Ahn et al.

(10) Patent No.: US 12,105,393 B2
(45) Date of Patent: Oct. 1, 2024

(54) VEHICLE DISPLAY DEVICE

(71) Applicant: HYUNDAI MOBIS Co., Ltd., Seoul (KR)

(72) Inventors: Sung Joon Ahn, Yongin-si (KR); Seung Hwan Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/105,929

(22) Filed: Feb. 6, 2023

(65) Prior Publication Data
US 2023/0185147 A1 Jun. 15, 2023

Related U.S. Application Data

(63) Continuation of application No. 16/690,214, filed on Nov. 21, 2019, now Pat. No. 11,599,002.

(30) Foreign Application Priority Data

Nov. 21, 2018 (KR) .......................... 10-2018-0144590

(51) Int. Cl.
*G02F 1/157* (2006.01)
*G02F 1/1516* (2019.01)
*G03B 21/10* (2006.01)
*G03B 21/62* (2014.01)

(52) U.S. Cl.
CPC .......... *G02F 1/15165* (2019.01); *G02F 1/157* (2013.01); *G03B 21/10* (2013.01); *G03B 21/62* (2013.01); *G02F 2201/44* (2013.01)

(58) Field of Classification Search
CPC .. G02F 1/15165; G02F 1/157; G02F 2201/44; G03B 21/10; G03B 21/62; B60K 35/00; B60K 35/29; B60K 2360/188; B60K 2360/334; B60J 3/04; B60W 50/082; G05D 1/0061
USPC .................................................. 359/265–275
See application file for complete search history.

(56) References Cited

U.S. PATENT DOCUMENTS 9,690,174 B2 6/2017 Wang
10,522,106 B2 * 12/2019 Hazra ..................... G06T 11/60
2014/0078410 A1 3/2014 Wang

FOREIGN PATENT DOCUMENTS

| JP | 2017-189998 A | 10/2017 |
| KR | 10-2009-0116486 | 11/2009 |
| KR | 10-2009-0116486 A | 11/2009 |
| KR | 10-1396235 B1 | 5/2014 |
| KR | 10-2018-0032110 A | 3/2018 |

* cited by examiner

*Primary Examiner* — Tuyen Tra
(74) *Attorney, Agent, or Firm* — NSIP Law

(57) ABSTRACT

A vehicle display device using a hetero electrochromic film according to the present invention includes a projection part configured to project a predetermined image on one or more of a windshield and a window, a hetero electrochromic film formed on one or more of the windshield and the window, and a driving part configured to drive the projection part and the hetero electrochromic film.

21 Claims, 5 Drawing Sheets

VEHICLE DISPLAY DEVICE

CROSS-REFERENCE TO RELATED APPLICATION

This application is a continuation application of U.S. application Ser. No. 16/690,214, which claims the benefit under 35 USC § 119(a) of Korean Patent Application No. 10-2018-0144590 filed on Nov. 21, 2018, in the Korean Intellectual Property Office, the entire disclosure of which are incorporated herein by reference for all purpose.

BACKGROUND

1. Field of the Invention

The present invention relates to a vehicle display device, and more specifically, to a vehicle display device using a hetero electrochromic film.

2. Discussion of Related Art

As researches and developments on smart windows formed of glass, in which light transmittance can be controlled to prevent energy loss and the like in buildings, are being carried out, and researches on autonomous driving vehicles are recently actively being carried out, various researches to apply the smart windows to the autonomous driving vehicles are also being carried out.

For example, technologies which use windshields for large screen displays inside vehicles and side glass are invented, and product concepts such as transparent light-emitting diodes (LEDs), transparent organic LEDs, and the like are begin proposed but are still not commercialized due to vehicle environment (temperature and the like) and cost problems.

In addition, although concepts in which electrochromic external shielding technology is applied to vehicles are proposed, suspended particle devices (SPDs) are only applied to substitute for tinting, advertisement using inner projections, and the like, and functions thereof are very limited.

In this regard, Korean Patent Publication No. 10-2009-0116486 (Title of Invention: Display Device for Automobile), which relates to a display device for automobiles capable of improving image quality of an image by adjusting optical transmittance of a vehicle windshield on which an image is projected, discloses a technology including an image projection part configured to project a predetermined image on a windshield, a polymer dispersed liquid crystal (PDLC) film formed on the windshield and configured to adjust light transmittance and reflection rate of the image projected by the image projection part, and a driving part configured to drive the image projection part and the PDLC film.

SUMMARY OF THE INVENTION

The present invention is directed to providing a vehicle display device which simultaneously uses two types of electrochromic films that are applied to one or more of a windshield and a window to provide various driving situations and functions through a projection display.

However, technical objectives to be solved through the present embodiment are not limited the above-described technical objective, and other technical objectives may present.

According to an aspect of the present invention, there is provided a vehicle display device using a hetero electrochromic film including a projection part configured to project a predetermined image on one or more of a windshield and a window, a hetero electrochromic film formed on one or more of the windshield and the window, and a driving part configured to drive the projection part and the hetero electrochromic film.

The hetero electrochromic film may include a suspended particle device (SPD) film and a polymer dispersed liquid crystal (PDLC) film.

The SPD film may be formed on at least one or more of the windshield and the window, and the PDLC film may be formed on the SPD film.

The projection part may be installed in an inner region of a vehicle, and transparency of a surface side, on which an image is projected by the projection part, of the PDLC film may be controlled by the driving part.

The driving part may drive the projection part to project an image so that the PDLC film is controlled to be in an opaque mode, and lower transparency of the SPD film to shield external light.

A size of a particle in one or more of the SPD film and PDLC film may be controlled so that one film layer is formed and internal depth is controlled.

The driving part may drive one or more power sources of the windshield and the window or control transparency according to a vehicle driving mode.

In a case in which the vehicle driving mode is an autonomous driving mode, the driving part may control one or more of the windshield and the window to be opaque, and in a case in which the vehicle driving mode is a manual driving mode, the driving part may control the windshield and the window to be transparent.

In the autonomous driving mode, the driving part may cut off a power source of the SPD film of the hetero electrochromic film to drive the SPD film to have an opaque black color and cut off a power source of the PDLC film to drive the PDLC film to have an opaque white color.

In the manual driving mode, the driving part may supply power to the SPD film of the hetero electrochromic film to drive the SPD film to be transparent and supply power to the PDLC film to control the PDLC film to be transparent.

The SPD film and the PDLC film may be dividedly applied to the windshield and the window, and the driving part may control the transparency of only one or more partial regions of the windshield and the window to display a driving information window using the projection part or display an image projected by the projection part in the manual driving mode.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
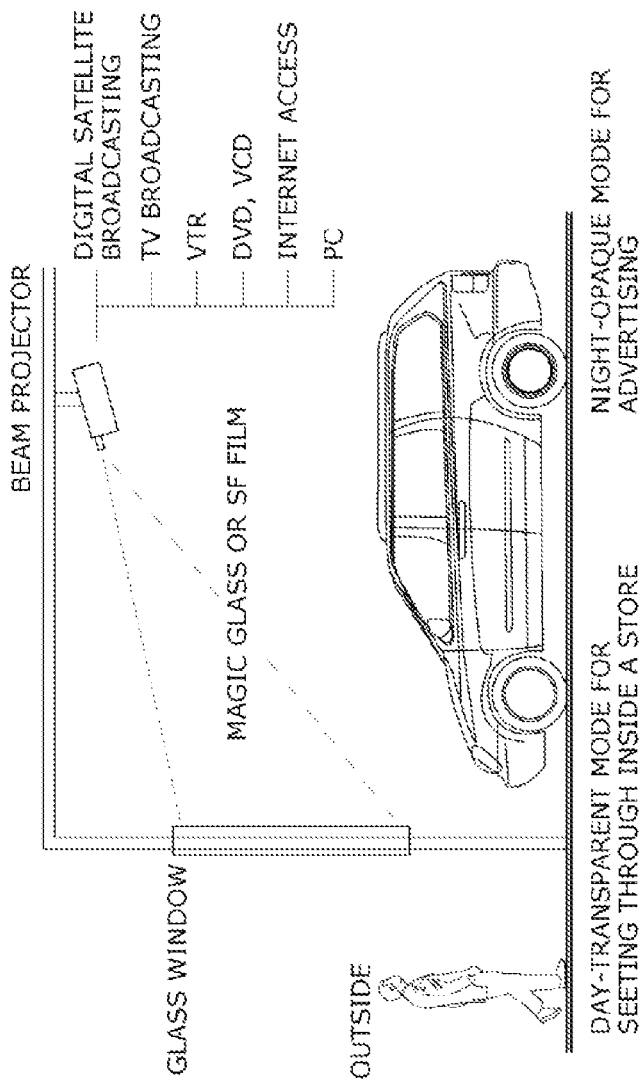
FIG. 1 is a view for describing a polymer dispersed liquid crystal (PDLC) film and a suspended particle device (SPD) film.

Hereinafter, the present invention will be described in detail with reference to the accompanying drawings. However, embodiments of the present invention may be implemented in several different forms and are not limited to the embodiments described herein. In addition, parts irrelevant to description are omitted in the drawings in order to clearly explain the embodiments of the present invention.

When a certain part "includes" a certain component throughout the specification, this does not exclude other components unless explicitly described otherwise, and other components may further be included.

The present invention relates to a vehicle display device 100 using a hetero electrochromic film 110.

In the vehicle display device 100 according to one embodiment of the present invention, the hetero electrochromic film 110 is applied to one or more of a windshield and a window 10. Here, in one embodiment of the present invention, a suspended particle device (SPD) film 111 and a polymer dispersed liquid crystal (PDLC) film 112 are simultaneously applied to the hetero electrochromic film 110.

Hereinafter, the PDLC film 112 and the SPD film 111 will be described with reference to FIG. 1, and the vehicle display device 100 to which the the SPD film 111 and the PDLC film 112 are simultaneously applied will be described with reference to FIGS. 2 to 5B.

FIG. 1 is a view for describing the PDLC film 112 and the SPD film 111.

The PDLC 112 film is a film which changes to have an opaque white color when electricity is applied thereto and is typically used to decorate a conference room or an interior for a private space. However, it is difficult to variably dim the PDLC film 112, and thus the PDLC film 112 is typically operated using an on/off method.

In addition, in a case in which a beam projection is provided, the PDLC film 112 may also be used as a projection screen. For example, in a case in which the beam projection projects an image on an inner side of a building as illustrated in FIG. 1, a person located outside the building can see the projected image.

Accordingly, the PDLC film 112 may be operated in a transparent mode during daytime so that the person located outside the building may see products disposed in a shop in the building, and the PDLC film 112 may be operated in an opaque mode during nighttime and a projection image may be projected thereon so that the PDLC film 112 may be used as a billboard.

As described above, the PDLC film 112 may be used in the transparent mode or the opaque mode according to a power source being turned on or off, and in the case of the opaque mode, the projection image may be projected on the PDLC film 112.

In addition, the PDLC film 112 has an advantage in that, even in the case of nighttime with little light, the PDLC film 112 can be used as an external billboard through the opaque mode and by projecting a projection image thereon.

Brightness of the SPD film 111 is freely changed (variable dimming) according to a voltage level, and the SPD film 111 has a characteristic of having a short operating time. In addition, since the SPD film 111 may be applied in any shape, the SPD film 111 may be variously applied to glass of a building, a vehicle, a plane, a vessel, or the like.

For example, the SPD film 111 may be applied to a vehicle window, and in this case, the SPD film 111 may be used for ultraviolet tinting.

In one embodiment of the present invention, the PDLC film 112 and the SPD film 111 may be simultaneously applied to provide various driving situations such as an autonomous driving mode or a manual driving mode, various driving modes for a driver or passenger, and image content.

Figure 2:
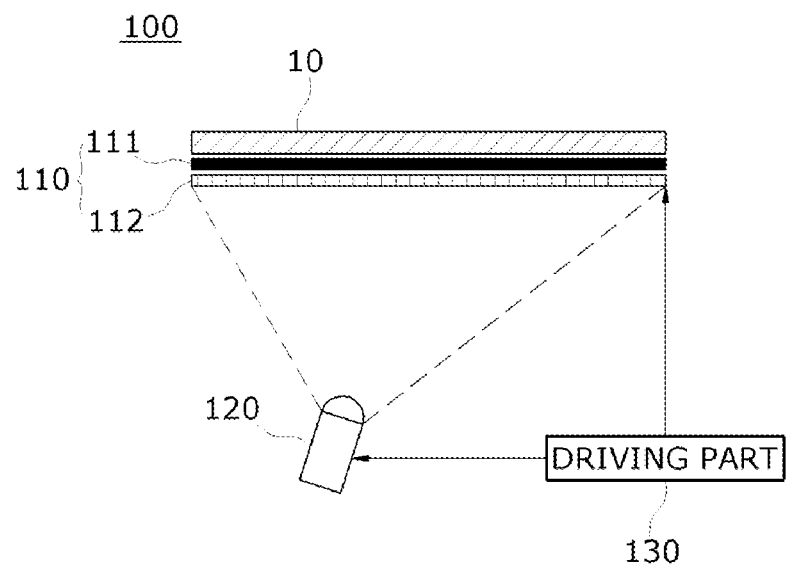
FIG. 2 is a view for describing a vehicle display device according to one embodiment of the present invention.

FIG. 2 is a view for describing the vehicle display device 100 according to one embodiment of the present invention.

The vehicle display device 100 according to one embodiment of the present invention includes the hetero electrochromic film 110, a projection part 120, and a driving part 130.

The projection part 120 projects a predetermined image on one or more of the windshield and window 10. Here, in one embodiment of the present invention, the projection part 120 is installed in an inner region of a vehicle.

The hetero electrochromic film 110 is formed on one or more of the windshield and window 10 and is formed of the PDLC film 112 and the SPD film 111 being simultaneously applied thereto.

Here, the SPD film 111 is formed on the windshield and window 10, and the PDLC film 112 is formed on the SPD film 111. That is, the SPD film 111 is formed between the windshield or window 10 and the PDLC film 112.

Depth of the PDLC film 112 may be adjusted like a projection board. As power is applied thereto, a transmittance of the PDLC film 112 increases. In a case in which a power source is turned off, the PDLC film 112 has an opaque color like a diluted white color. In the embodiment of the present invention, the PDLC film 112 may have a white base color.

Generally, the PDLC film 112 has a structure of rear display form in which the PDLC film 112 is located between the projection part and a person so that the person located at a opposite side of the projection part can see an image. This is an advantageous structure from a viewpoint of image quality (clarity or visibility) and matches with a display concept of an external advertisement.

However, in the case of the vehicle, the projection part 120 cannot be installed outside the vehicle to display a projection image on the windshield or window 10 for a person who watches the displayed image outside. That is, in the case in which the projection part 120 is installed outside the vehicle, it may be impossible or not proper to secure an image due to foreign matter such as dusts and rain.

Accordingly, in one embodiment of the present invention, the projection part is installed in an interior of the vehicle, and a transparency of a surface side, on which an image is projected by the projection part 120, of PDLC film 112 may be controlled by the driving part 130.

That is, to secure clarity or visibility of the projected image on a region of the windshield or window 10, in one embodiment of the present invention, the PDLC film 112 which may display an opaque white color is provided in the interior of the vehicle to form a basic structure for a projection image since the highest image quality may be obtained under conditions in which the projection part 120 is provided in the interior of the vehicle and the surface of the side, on which the image is projected, has an opaque white color.

As described above, the SPD film 111 may adjust shade and shadow like a tinting film. When power is applied thereto, transmittance increases, and in a case in which the power source is turned off, the SPD film 111 displays a dark opaque color. In the embodiment of the present invention, the SPD film 111 may have a dark black base color.

The SPD film 111 is formed between the PDLC film 112 and the windshield or window 10. That is, when only the opaque white PDLC film 112 is provided on the windshield or window 10, image quality is not perfectly secured through the projection part 120.

That is, when a region of the windshield or window 10 which is in an opaque white state becomes bright due to external light, a problem occurs in that an image is faintly seen when being projected.

Accordingly, in order to shield external light, when a tinting treatment is performed on the windshield or window 10, the problem may be reduced slightly, but it is not sufficient to perfectly shield the external light, and an additional treatment of providing a transparent reflective film or the like capable of shielding the external light may need to be performed.

However, in this case, when electricity is applied to the PDLC film 112 such that the PDLC film 112 becomes transparent for manual driving, an external transmittance decreases significantly, and thus it is difficult to drive manually.

In order to solve two such problems, a structure capable of shielding external light and securing transmittance is required.

To this end, in one embodiment of the present invention, the SPD film 111 is formed between the PDLC film 112 capable of adjusting shade and shadow and the windshield or window 10, the PDLC film 112 is controlled to be in an opaque mode because the driving part 130 drives the projection part 120 to project an image, and transparency of the SPD film 111 is controlled to be lowered so as to shield external light.

That is, when the windshield or window 10 is used as a display, depth of the SPD film 111 may be increased to shield external light such that an inner side thereof maintains a white surface, and thus a projection image can be seen, electricity may be applied such that a region of the PDLC film 112 becomes transparent and the SPD film 111 disposed therebetween also becomes transparent for manual driving, and thus transmittance for the manual driving can be secured.

The driving part 130 drives the projection part 120 and the hetero electrochromic film 110.

Here, the driving part 130 may separately drive the projection part 120 and the hetero electrochromic film 110 according to a vehicle driving mode by driving one or more power sources of the windshield and window 10 or controlling transparency thereof.

Figure 3:
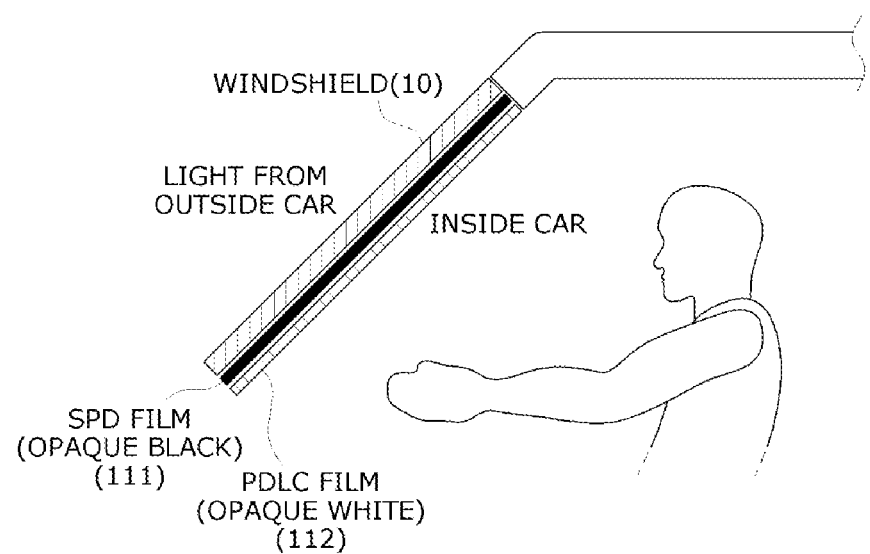
FIG. 3 is a view for describing a control case in an autonomous driving mode.
Figure 4:
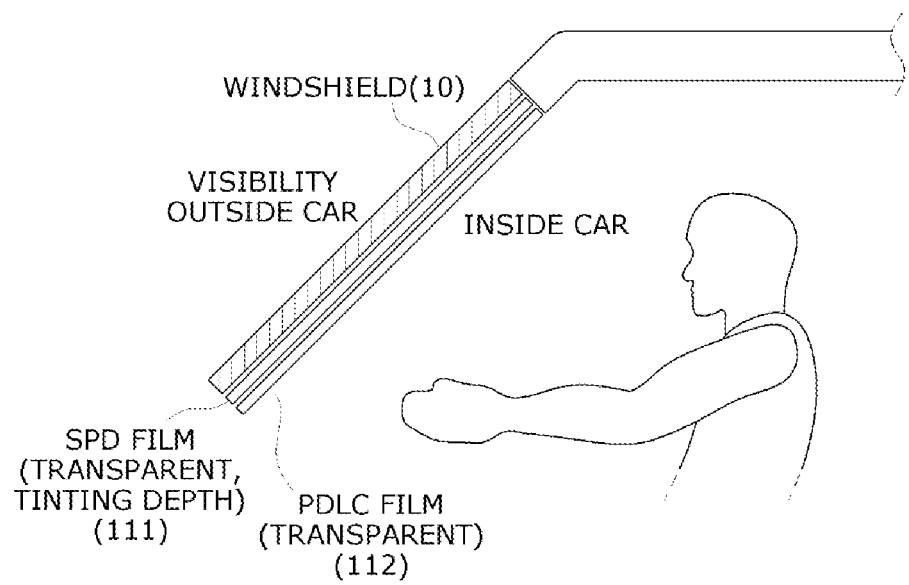
FIG. 4 is a view for describing a control case in a manual driving mode.

FIG. 3 is a view for describing a control case in the autonomous driving mode, and FIG. 4 is a view for describing a control case in the manual driving mode.

For example, in a case in which a vehicle driving mode is the autonomous driving mode, as described in FIG. 3, the driving part 130 controls the windshield or window 10 to have an opaque white color, and thus the windshield or window 10 can be used as a large screen display region.

That is, the driving part 130 may cut off power of the SPD film 111 of the hetero electrochromic film 110 such that the SPD film 111 has an opaque shield color and cut off power of the PDLC film 112 such that the PDLC film 112 has an opaque white color in the autonomous driving mode.

In this case, an entire region of the windshield or window 10 is controlled to be opaque so that a projection image can be seen.

In addition, in a case in which a vehicle driving mode is the manual driving mode, as described in FIG. 4, the driving part 130 may control the windshield or window 10 to be transparent, and thus external visibility can be secured and driving is possible.

That is, in the manual driving mode, the driving part 130 may supply power to the SPD film 111 of the hetero electrochromic film 110 such that the SPD film 111 becomes transparent and also supply power to the PDLC film 112 such that the PDLC film 112 becomes transparent.

Meanwhile, the vehicle display device 100 according to one embodiment of the present invention may be formed such that the SPD film 111 and the PDLC film 112 of the windshield and window 10 are dividedly applied.

Figure 5A:
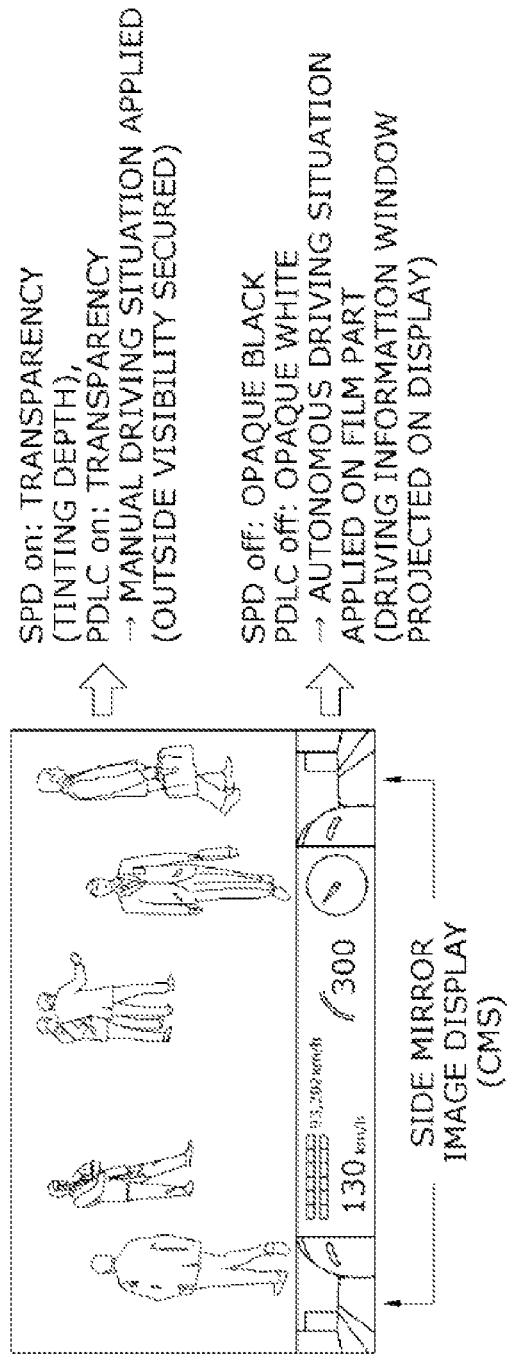
FIGS. 5A and 5B are views for describing a case of divided applications.
Figure 5B:
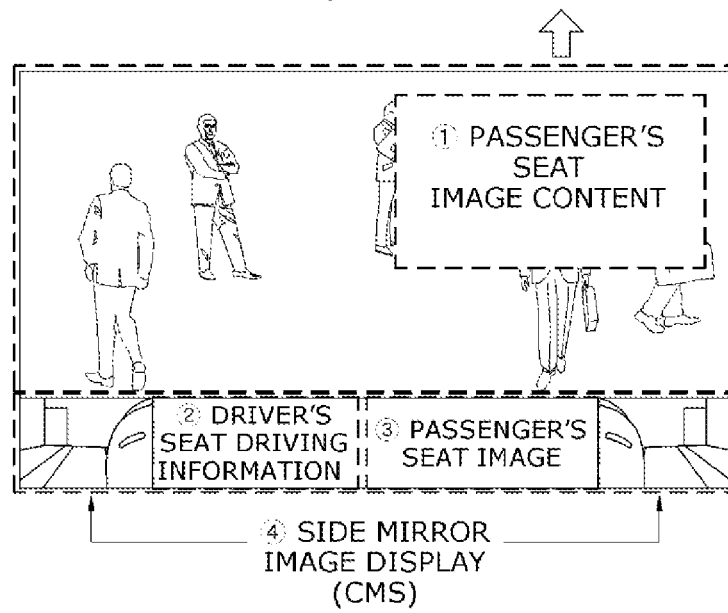

FIGS. 5A and 5B are views for describing a case in which the hetero electrochromic film 110 is dividedly applied on the windshield or window 10.

The driving part 130 controls transparency of only one or more partial regions of the windshield and window 10 such that a driving information window is displayed through the projection part 120 or an image projected by the projection part 120 is displayed in the manual driving mode.

That is, in one embodiment of the present invention, a mixed mode may be performed in which an application region of the SPD film 111 and an application region of the PDLC film 112 are divided, a driving information window or image content are displayed on a partial region of the windshield or window 10, and a partial region is controlled to be transparent to secure driving visibility during a manual driving.

For example, as illustrated in FIG. 5A, external visibility can be secured by applying power to the SPD film 111 such that the SPD film 111 is transparent and also applying power to the PDLC such that the windshield 10 is transparent.

In this case, power for a partial region of the SPD film 111 may be cut off such that the partial region is driven in an black opaque mode, power of the PDLC film 112 may be also cut off such the PDLC film 112 is driven in an white opaque mode, and thus driving information or a side mirror image can be seen using the projection part 120.

In another example, an infotainment content image may be output on the windshield 10 of a passenger seat area instead of a driver's seat area.

That is, the SPD film 111 and the PDLC film 112 may be controlled such that most of an area of the windshield 10 may be controlled as in the manual driving mode, and the SPD film 111 and the PDLC film 112 may be controlled such that image content may be output on a partial region on a side of a passenger seat and driving information and a passenger seat image may be output on a remaining partial region as in the autonomous driving mode.

According to one embodiment of the present invention, the driver or passenger can really feel various types of content in the vehicle, and new experiments for a future vehicle can be provided to a user.

In addition, in the vehicle display device 100 according to one embodiment of the present invention, a voltage, a current, or the like of electricity applied for improving emotional quality when the windshield or window 10 is discolored through the electricity applied may be adjusted to gradually change transparency and opacity and improve effect from a viewpoint of a user interface (UI). In addition, in a case in which an immediate change is required according to a driving mode, the immediate change may be performed by turning the power on or off.

Meanwhile, when the above described structure of the windshield or window 10 is considered, in a case in which one film structure capable of shielding external light and securing an opaque white color in the future is formed, a concept for autonomous driving and manual driving may be implemented using a more simple structure.

In addition, in one embodiment of the present invention, a particle size, by which internal depth is adjusted, of at least one or more of the SPD film 111 and the PDLC film 112 may also be adjusted to facilitate a change between perfect shielding and transparency thereof.

Meanwhile, in one embodiment of the present invention, the driving part 130 may include a memory (not shown) and a processor (not shown).

A program for controlling the projection part 120 or each film is stored in the memory, and the processor executes the program stored in the memory. Here, the memory collectively refers to a non-volatile storage device, which continuously stores stored information even when power is not supplied thereto, and a volatile storage device.

For example, the memory may include a NAND flash memory such as a compact flash (CF) card, a secure digital (SD) card, a memory stick, a solid-state drive (SSD), and a micro SD card, a magnetic computer storage device such as a hard disk drive (HDD), and an optical disc drive such as compact disc read only memory (CD-ROM), and (digital versatile disc-read only memory) DVD-ROM.

For reference, the components illustrated in the drawings according to the embodiment of the present invention may be formed using software or hardware, such as a field programmable gate array (FPGA) and an application specific integrated circuit (ASIC), and serve predetermined functions.

However, the components are not limited to the software or hardware and may be stored in an addressable storage medium or may reproduce one or more processors.

Accordingly, as an example, the components include components such as software components, object oriented software components, class components, and task components, processors, functions, attributes, procedures, subroutines, segments of program codes, drivers, firmware, micro codes, circuits, data, databases, data structures, arrays, and variables.

The components and the functions provided in the components may be coupled to form a smaller number of components or divided to form a larger number of components.

Meanwhile, one embodiment of the present invention may also be implemented in a computer program executed by a computer and stored in a medium or a recording medium including instructions executable by a computer. A computer readable medium may be any available medium accessible through a computer and includes volatile and non-volatile media and removable and non-removable media. In addition, the computer readable medium may include a computer storage medium and a communication medium. The computer storage medium includes volatile and non-volatile media and removable and non-removable media implemented using any method or technology for storing a computer readable instruction, a data structure, a program module, or other pieces of data. The communication media typically include a computer readable instruction, a data structure, a program module, other pieces of data in a modulated data signal such as a carrier wave, or another transport mechanism and any information transmission medium.

Although the method and the system of the present invention has been described with reference to the specific embodiment, the components, or some or all operations thereof may be implemented using a computer system including a general-purpose hardware architecture.

According to the above-described embodiments, a projection part is installed in a vehicle, and a projection image is projected on a windshield or window so that the windshield or window can be utilized as a large screen display.

In addition, in this case, since the SPD film and the PDLC film are simultaneously used, display image quality such as clarity and feeling of color can be secured, a trend of an in-vehicle infotainment (IVI) technology can be satisfied, and various services and functions can be utilized in a vehicle by dividing a region of the windshield or window to which electricity is applied.

In addition, since the SPD film and the PDLC film are controlled according to an autonomous driving mode or a manual driving mode, various driving modes can be provided to a user.

In addition, the SDP film and the PDLC film can be integrally formed using a stack-type glass, and quality of a post-processing product manufacture can be secured through the SPD film and the PDLC film.

The above description is only exemplary, and it will be understood by those skilled in the art that the invention may be performed in other concrete forms without changing the technological scope and essential features. Therefore, the above-described embodiments should be considered as only examples in all aspects and not for purposes of limitation. For example, each component described as a single type may be realized in a distributed manner, and similarly, components that are described as being distributed may be realized in a coupled manner.

The scope of the present invention is defined by the appended claims and encompasses all modifications or alterations derived from meanings, the scope, and equivalents of the appended claims.

What is claimed is:

1. A vehicle display device using an electrochromic film, the vehicle display device comprising:
    a projector configured to project, from the interior of the vehicle, an image onto the electrochromic film, which is disposed on an interior side of a windshield or window of the vehicle;
    a processor configured to drive the projector and the electrochromic film,
    wherein the projector is installed in the interior of the vehicle and display of the image by the projector is controlled by the processor; and
    transparency of the electrochromic film, onto which the image is projected by the projector, is controlled by the processor depending on a vehicle driving mode; and
    wherein the vehicle driving mode is selectively determined between an autonomous driving mode and a manual driving mode.

2. The vehicle display device of claim 1, wherein the electrochromic film includes a first film and a second film, wherein the first film is layered between the windshield or window and the second film.

3. The vehicle display device of claim 2, wherein the first film is a suspended particle device (SPD) film and the second film is a polymer dispersed liquid crystal (PDLC) film.

4. The vehicle display device of claim 2, wherein the processor is further configured to:
    when selecting the autonomous driving mode:
        control the second film to be in an opaque mode; and
        lower transparency of the first film to shield external light.

5. The vehicle display device of claim 4, wherein the processor is further configured to:
when selecting the manual driving mode:
control the second film to not be in the opaque mode; and
raise the transparency of the first film to reduce shielding of external light.

6. The vehicle display device of claim 2, wherein a size of a particle in the first film or the second film is controlled so that one film layer is formed and internal depth is controlled.

7. A vehicle display device using an electrochromic film, the vehicle display device comprising:
a projector configured to project an image on a windshield or a window of a vehicle;
the electrochromic film, which is formed on the windshield or the window; and
a processor configured to drive the projector and the electrochromic film,
wherein the processor is configured to drive one or more power sources of the windshield or window or control transparency of the electrochromic film according to a vehicle driving mode that is selectively determined between an autonomous driving mode and a manual driving mode.

8. The vehicle display device of claim 7, wherein:
when the vehicle driving mode is the autonomous driving mode, the processor controls the electrochromic film to be opaque; and
when the vehicle driving mode is the manual driving mode, the processor controls the electrochromic film to be transparent.

9. The vehicle display device of claim 8, wherein:
the electrochromic film includes a first film and a second film, wherein the first film is formed on the windshield or window and the second film is formed on the first film.

10. The vehicle display device of claim 9, wherein, in the autonomous driving mode, the processor is configured to:
cut off a power source of the first film of the electrochromic film to cause the first film to have an opaque black color; and
cut off a power source of the second film to cause the second film to have an opaque white color.

11. The vehicle display device of claim 9, wherein, in the manual driving mode, the processor is configured to:
supply power to the first film of the electrochromic film to cause the first film to be transparent; and
supply power to the second film to cause the second film to be transparent.

12. The vehicle display device of claim 9, wherein:
the first film and the second film are layered on the windshield or window.

13. The vehicle display device of claim 12, wherein:
the processor controls transparency of a partial region of the windshield or window to display a driving information window using the projector or to display an image projected by the projector in the manual driving mode.

14. A method comprising:
controlling projection of images from a projector in a vehicle onto a windshield or window of the vehicle;
controlling opacity of the windshield or window of the vehicle, wherein when the projector is projecting images onto the windshield or window of the vehicle the opacity of the windshield or window is increased and when the projector is not projecting images onto the windshield or window of the vehicle the opacity of the windshield or window is decreased;
selectively determine a driving mode of the vehicle between a first mode and a second mode.

15. The method of claim 14, wherein a patch of electrochromic film is disposed on an interior side of the windshield or window of the vehicle, and wherein the controlling the opacity of the windshield or window comprises controlling supplying of power to the electrochromic film.

16. The method of claim 14, further comprising:
when determined that the driving mode is the first mode, increasing the opacity of the windshield or window of the vehicle and causing the projector to project the images onto the windshield or window of the vehicle.

17. The method of claim 16, further comprising:
when determined that the driving mode is the second mode, decreasing the opacity of the windshield or window of the vehicle and causing the projector to stop projecting the images onto the windshield or window of the vehicle.

18. The method of claim 14, wherein the controlling the opacity of the windshield or window of the vehicle comprises controlling supplying of power to a suspended particle device (SPD) film and controlling supplying of power to a polymer dispersed liquid crystal (PDLC) film.

19. The method of claim 18, wherein the SPD film is arranged between the PDLC film and the windshield or window of the vehicle.

20. The method of claim 14, further comprising:
responsive to determining that the vehicle has exited, or is going to exit:
reducing the opacity of the windshield or window of the vehicle; and
causing the projector to stop displaying the images.

21. The method of claim 14, wherein the first mode is an autonomous driving mode and the second mode is a manual driving mode.

* * * * *